United States Patent [19]

Tysoe

[11] Patent Number: 4,577,260

[45] Date of Patent: Mar. 18, 1986

[54] VEHICLE LAMP ASSEMBLIES

[75] Inventor: Nicholas W. Tysoe, Worcester, England

[73] Assignee: Britax Vega Limited, Droitwich, England

[21] Appl. No.: 660,252

[22] Filed: Oct. 12, 1984

Related U.S. Application Data

[63] Continuation of Ser. No. 501,014, Jun. 6, 1983, abandoned.

[30] Foreign Application Priority Data

Jun. 24, 1982 [GB] United Kingdom ................. 8218271

[51] Int. Cl.$^4$ ................................ G03B 15/02

[52] U.S. Cl. ................................ 362/61; 362/328; 362/331; 362/268; 362/300

[58] Field of Search .................... 362/61, 80, 83, 257, 362/268, 293, 296–301, 307–311, 317, 326, 331, 333, 343, 346, 351, 337, 340; 350/451, 452, 286

[56] References Cited

U.S. PATENT DOCUMENTS

| | | | |
|---|---|---|---|
| 1,345,073 | 6/1920 | Clark | 362/329 X |
| 1,399,749 | 12/1921 | Conklin | 362/328 |
| 1,883,360 | 10/1932 | Fortney | 362/268 |
| 1,904,574 | 4/1933 | Turner | 362/328 X |
| 1,995,012 | 3/1935 | Rivier | 362/346 X |
| 2,044,224 | 6/1936 | Peple | 362/61 X |
| 2,119,370 | 5/1938 | Leunen | 362/300 X |
| 3,969,621 | 7/1976 | Ferrell | 362/299 |
| 4,158,222 | 6/1979 | Cook | 362/328 X |
| 4,177,505 | 12/1979 | Carel | 362/328 X |
| 4,293,892 | 10/1981 | Plummer | 362/331 X |
| 4,390,934 | 6/1983 | Willing | 362/329 X |

FOREIGN PATENT DOCUMENTS

| | | | |
|---|---|---|---|
| 0071583 | 2/1983 | European Pat. Off. | 362/61 |
| 1663875 | 9/1953 | Fed. Rep. of Germany | 350/452 |
| 1183873 | 12/1964 | Fed. Rep. of Germany | 362/293 |
| 1186004 | 1/1965 | Fed. Rep. of Germany | 362/331 |
| 2385977 | 12/1978 | France | 362/331 |
| 2501333 | 9/1982 | France | 362/296 |
| 2507741 | 12/1982 | France | 362/61 |
| 2509429 | 1/1983 | France | 362/61 |
| 812148 | 4/1959 | United Kingdom . | |
| 1016301 | 1/1966 | United Kingdom | 362/328 |
| 2070222 | 9/1981 | United Kingdom | 362/61 |

*Primary Examiner*—Ronald B. Cox
*Attorney, Agent, or Firm*—Hayes, Davis & Soloway

[57] ABSTRACT

A vehicle lamp assembly is disclosed for use when the outer cover or lens element extends round the corner of the vehicle or when the outer cover or lens element is significantly larger in one or two mutually perpendicular directions than in the other. The lamp assembly comprises a light source, a light transmitting cover element and a light transmitting intermediate element disposed between the source and the cover element. The intermediate element has coaxial cylindrical inner and outer surfaces located with the light source of their common axis, one of the cylindrical surfaces carrying elongated Fresnel prism formations of uniform cross-section extending parallel to the common axis and the other cylindrical surface carrying elongate Fresnel prism formations of constant cross-section extending in respective planes perpendicular to said common axis.

3 Claims, 4 Drawing Figures

FIG. 3.
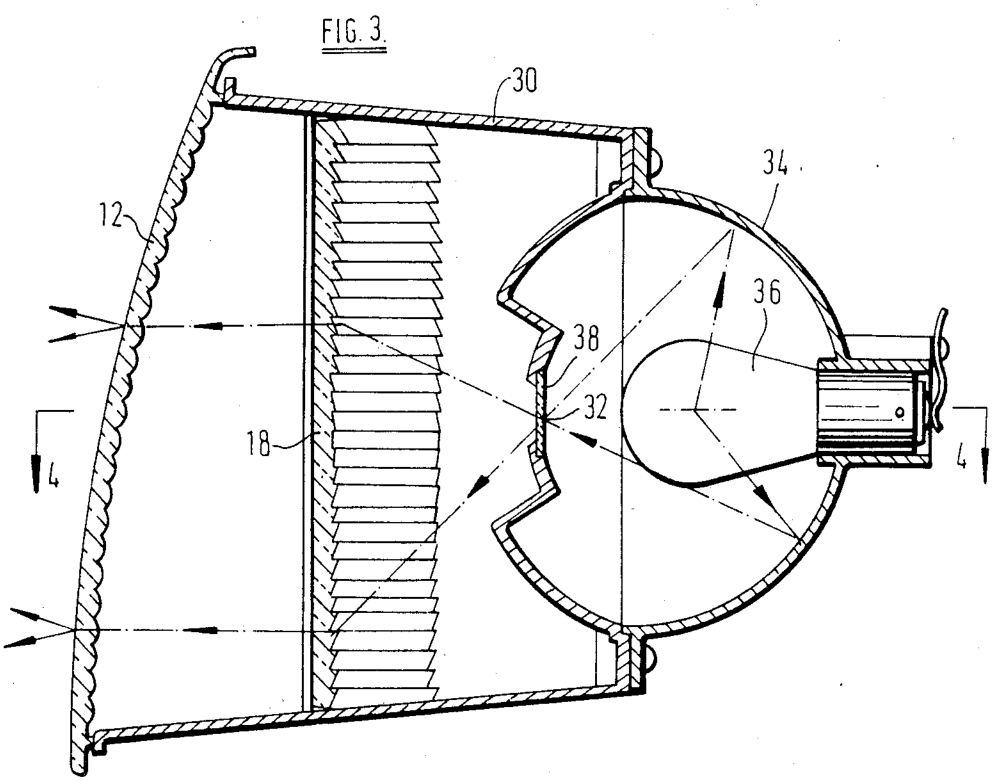
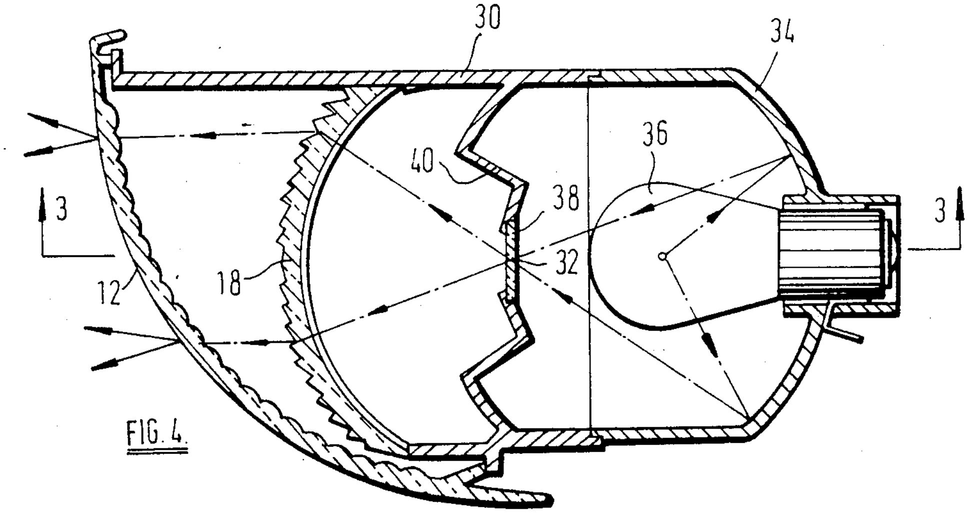
FIG. 4.

VEHICLE LAMP ASSEMBLIES

This is a continuation of application Ser. No. 501,014 filed June 6, 1983, now abandoned.

This invention relates to vehicle lamp assemblies and more particularly to signalling lights in which the outer cover or lens element extends round the corner of the vehicle. The invention is also applicable to signalling lights in which the outer cover or lens element is significantly larger in one of two mutually perpendicular directions than in the other.

Conventional optical collimating systems are essentially rotationally symmetrical about their optical axis. This can produce conflicting design requirements in a lamp where the physical shape of the outer lens and housing, through asymmetry or otherwise, are not compatible with the interposition of a rotationally symmetrical screen.

One solution of this problem is to use a Fresnel collector constructed in a rotationally asymmetrical form. However, such a collector would generally require a large number of prisms, each individually designed. The present invention aims to provide a collector which, while not being of rotationally symmetrical form, produces a collimated beam without requiring a multiplicity of individually designed prism elements.

According to the invention, a vehicle lamp assembly comprises a light source, a light transmitting cover element and a light transmitting intermediate element disposed between the source and the cover element and comprising coaxial cylindrical inner and outer surfaces located with the light source on their common axis, one of said cylindrical surfaces carrying elongated Fresnel prism formations of uniform cross section extending parallel to the common axis and the other cylindrical surface carrying elongate Fresnel prism formations of constant cross section extending in respective planes perpendicular to said common axis.

Preferably the prism formations on the outer surface are parallel to the common axis while those on the inner surface are perpendicular thereto.

The cover element may carry conventional pillow optics on one of its surfaces, preferably the inner surface.

In one form of the invention, the light source comprises a primary light source such as an electric filament lamp. In another form of the invention, the light source comprises a zone on to which light is focused from a remote primary source. For example the light source of the invention may be one focus of an ellipse with the primary light source at the other focus.

Two embodiments of the invention will now be described, by way of example, with reference to the accompanying drawings in which:

FIG. 3 is a vertical cross sectional view of another embodiment of the invention, taken on the line 3—3 in FIG. 4 and FIG. 4 is a cross sectional view taken on the line 4—4 in FIG. 3.

Figure 1:
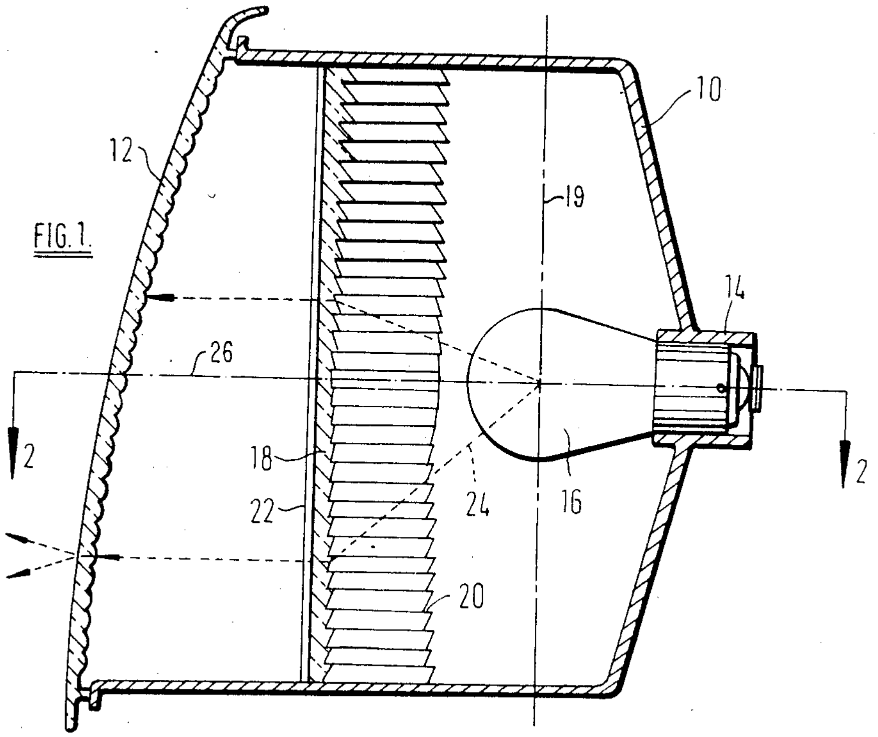
FIG. 1 is a vertical cross sectional view of the first embodiment of the invention, taken on the line 1—1 in FIG. 2.
Figure 2:
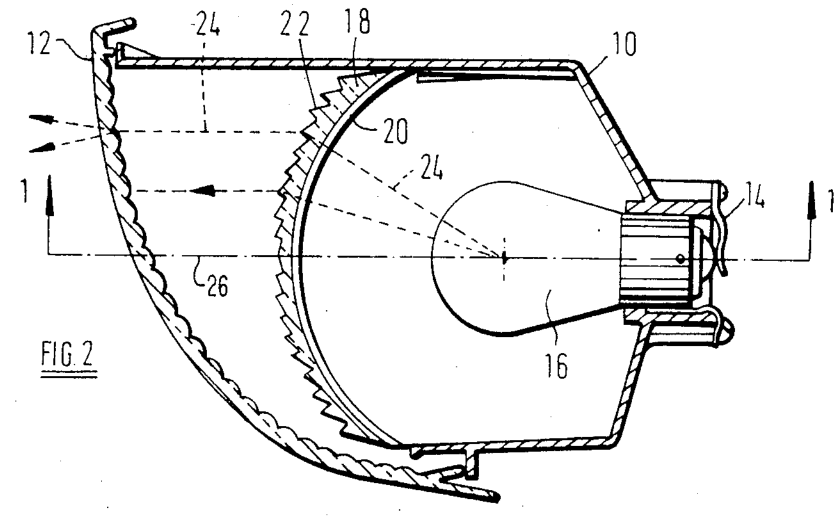
FIG. 2 is a cross sectional view taken on the line 2—2 in FIG. 1.

Referring to FIGS. 1 and 2, the front direction indicator lamp of a motor car consists of a housing 10 covered by a lens 12 with conventional pillow optics on its inner surface. The housing 10 includes a bulb holder 14 which supports a bulb 16.

Located between the bulb 16 and the lens 12 is an intermediate element 18 of transparent plastic, in the shape of a segment of a cylinder, the axis 19 of which passes through the filament of the bulb 16. The inner surface of the intermediate element 18, i.e. the surface closer to the lamp 16, carries elongated Fresnel prism formations 20 extending in respective planes perpendicular to the axis 19 of the cylinder, while the outer surface carries Fresnel prism formations 22 extending parallel to such axis 19.

When the bulb 16 is illuminated, rays of light therefrom, such as the ray 24 are deflected into horizontal planes parallel to the optical axis 26 of the lamp, as can best be seen in FIG. 1, but they still extend radially within such planes, as can be seen in FIG. 2. They are deflected parallel to the optical axis 26 of the lamp within such planes, i.e. in the vertical direction, by the Fresnel prisms on the outer surface, as shown in FIG. 2. Thus a parallel beam is directed on to the entire inner surface of the outer lens 12 where it is given the required amount of divergence by the pillow optics.

Referring to FIGS. 3 and 4, the invention may also be applied to a so-called "contrast" light of the type described in G.B. specification No. 1016301. The housing 30 of the lamp illustrated in FIGS. 3 and 4 has an outer lens 12 and an intermediate element 18 which are identical with the correspondingly numbered components illustrated in FIGS. 1 and 2 and which will therefore not be described in detail.

Located on the axis of the cylindrical intermediate element 18 is one focus 32 of an ellipsoidal reflector 34 which has the filament of a bulb 36 at its other focus. A light transmitting element 38, coloured in accordance with the required colour of the lamp when illuminated, is mounted at the first-mentioned focus 32 in an opaque support 40. The outer surface of the support 40 is coloured is accordance with the required colour of the lamp when not illuminated, usually white for a front direction indicator.

I claim:

1. A vehicle lamp assembly having an optical axis and comprising a light source, a light transmitting cover element which is unsymmetrical with respect said optical axis, a light transmitting intermediate element disposed between the source and the cover element and comprising generally cylindrical inner and outer surfaces having their axes coincident with each other, perpendicular to said optical axis and located with the light source at the intersection of said optical axis and said coincident axes, one of said cylindrical surfaces carrying elongate Fresnel prism formations of uniform cross-section extending in respective planes parallel to said coincident axes and the other cylindrical surface carrying elongate Fresnel prism formations of constant cross-section extending in respective planes perpendicular to said coincident axes, so as to direct collimated light from the source parallel to said optical axis and on to substantially the whole of the cover element.

2. A lamp assembly according to claim 1, wherein the prism formations on the outer surface of the intermediate element are parallel to the coincident axes while those on the inner surface are perpendicular thereto.

3. A lamp assembly according to claim 1, wherein one edge of the cover element lies in a plane perpendicular to the optical axis which is closer to the light source than the distance along the optical axis between the intermediate element and the light source.

* * * * *